United States Patent

[11] 3,603,132

[72] Inventor Horace D. Holmes
 Birmingham, Mich.
[21] Appl. No. 865,693
[22] Filed Oct. 13, 1969
[45] Patented Sept. 7, 1971
[73] Assignee Masco Corporation
 Taylor, Mich.

[54] TOOL FOR MAKING LOCKNUT ASSEMBLIES
 11 Claims, 6 Drawing Figs.

[52] U.S. Cl. .................................................. 72/402,
 29/437, 29/517, 72/452, 72/453, 81/55
[51] Int. Cl. ....................................................... B21d 41/04
[50] Field of Search ........................................... 72/391,
 452, 453, 402, 399; 81/55, 56; 151/21 B, 21 C, 2
 R; 29/517, 437, 243.5

[56] References Cited
 UNITED STATES PATENTS
1,925,714 9/1933 Crist .............................. 81/10
2,513,780 7/1950 Baxter .......................... 81/10

| 2,538,343 | 1/1951 | Van Winkle | 81/10 |
| 3,003,378 | 10/1961 | Hotchner | 71/52.4 |
| 3,479,714 | 11/1969 | Allsop | 29/200 |
| 2,815,217 | 12/1957 | Fortunski | 72/402 |
| 3,028,777 | 4/1962 | Essex | 81/55 |
| 3,041,902 | 7/1962 | Wing | 81/56 |
| 3,379,231 | 4/1968 | Gallo | 145/52 |
| 3,417,598 | 12/1968 | Valente | 72/402 |
| 3,478,564 | 11/1969 | Hurd | 72/391 |

Primary Examiner—Charles W. Lanham
Assistant Examiner—Gene P. Crosby
Attorney—Whittemore, Hulbert & Belknap ABSTRACT: A tool for use with a torque wrench for tightening a nut on a bolt and then crimping the sides of the nut to provide substantially complete engagement of the threads of the nut and bolt to form a locknut assembly.

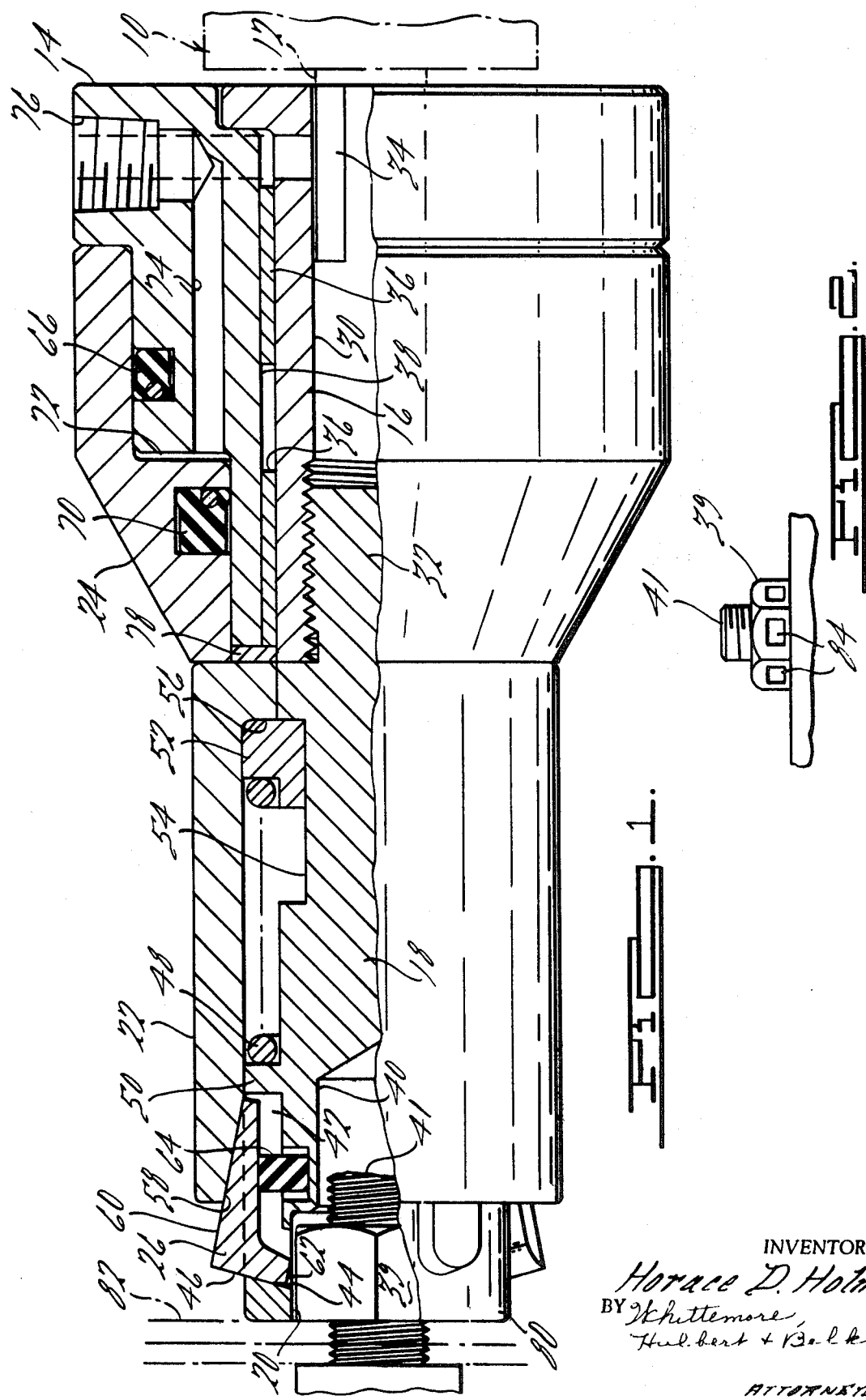

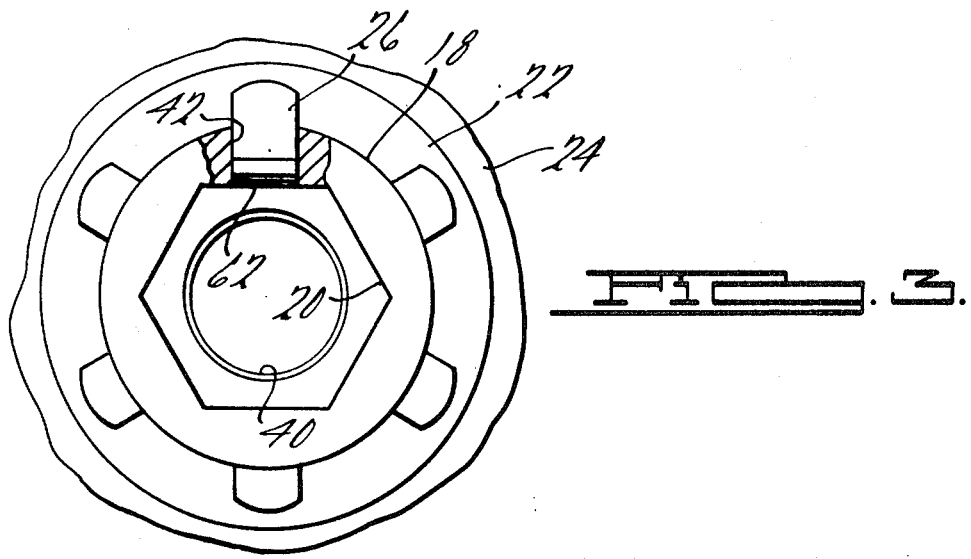
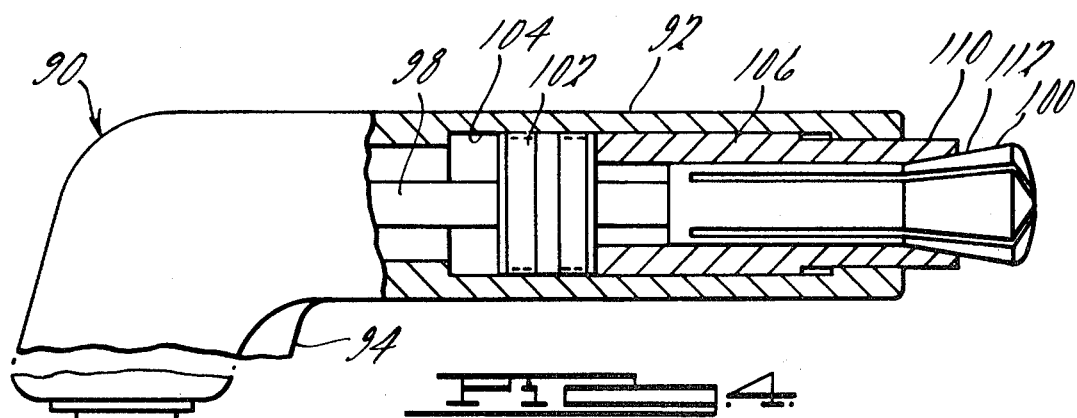
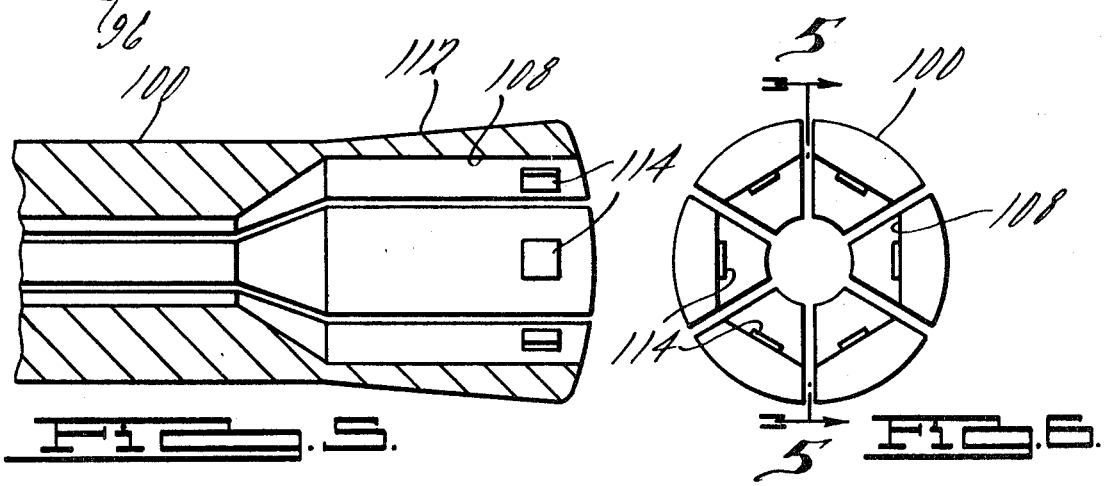
INVENTOR.
Horace D. Holmes.
BY Whittemore,
Hulbert & Belknap
ATTORNEYS

TOOL FOR MAKING LOCKNUT ASSEMBLIES

In my copending application Ser. No. 832,611, filed June 12, 1969, for "Locknut Assembly and Method of Making the Same," there is disclosed a locknut assembly and method of making the same which consists of a bolt having an oval or other noncircular cross section having a standard nut threaded thereon and then distorted to lock the nut on the bolt. The substantially complete engagement of the threads of the nut with the threads of the bolt effectively locks the nut on the bolt and prevents loosening of the nut under any vibrations or stresses to which the assembly is subjected in use. The nut can be removed with a power tool and reapplied to the bolt in a similar fashion to enable the locknut to be disassembled and reused a number of times without destroying the effectiveness of the lock between the nut and bolt.

The present invention is directed to an assembly tool for tightening the nut up on the bolt until a predetermined torque is achieved, or until the nut reaches a predetermined position relative to the parts being fastened, and then crimping or distorting the sides of the bolt inwardly to obtain the lock between the nut and bolt. In the drawings:

FIG. 1 is a sectional view of a tool according to the present invention;

FIG. 2 is an elevational view of a locknut assembly made by the tool;

FIG. 3 is an end elevational view of the tool;

FIG. 4 is a fragmentary sectional view of a modified form of the invention;

FIG. 5 is an enlarged fragmentary sectional view taken on line 5—5 of FIG. 6; and FIG. 6 is an end elevational view of the device shown in FIG. 5. Referring to FIGS. 1, 2, and 3, the assembly tool is adapted to be used with a conventional torque wrench indicated at 10 in FIG. 1. The torque wrench 10 may be of any standard type and includes a drive shaft indicated at 12 which is hydraulically or pneumatically driven to tighten a nut on a bolt to a predetermined torque. The assembly tool includes a housing 14 having a coupling member 16 rotatably mounted therein and adapted to receive the drive shaft 12 of the power tool 10 so as to be rotated therewith. A socket member 18 is secured to and rotatable with the coupling member 16 and is provided with a socket 20 at its outer end which is adapted to receive a nut threaded onto a bolt so as to tighten the nut on the bolt upon operation of the power tool. A sleeve 22 is slidable axially on the socket member 18 and is operated by a piston member 24 which is slidably mounted on the housing 14. A series of crimping members or punches 26 are mounted in the outer end of the socket member 18 and are adapted to move inwardly to engage the sides of the nut and crimp the same when the sleeve 22 is driven forwardly along the socket member 18 by the piston 24.

The coupling member 16 is provided with a bore 30 which is threaded at its outer end to engage the inner end 32 of the socket member 18. The coupling member 16 is provided with a square portion 34 which receives the correspondingly shaped drive shaft 12 so that the coupling member is rotatable with the drive shaft. The coupling member 16 is rotatable in bushings 36 mounted within the central bore 38 in the housing 14.

The socket 20 of the socket member 18 is hexagonal in shape to closely fit the sides of the nut 39 and inwardly thereof is provided with a bore 40 into which the end of the bolt 41 extends. The outer end of the socket member is provided with a series of slots 42, each of which has a portion 44 at its outer end which opens into the socket 20. A punch 26 is mounted in each of the slots 42 and has an outer end surface 46 which slidably engages the forward end of the slot 42 as the punch is driven inwardly into engagement with the nut in the socket 20.

The sleeve 22 is slidably mounted on the socket member 18 and is normally held in the retracted position shown in FIG. 1 by a spring 48 which is disposed between the sleeve 22 and socket member 18 and engages a shoulder 50 on the socket member 18 and a spacer ring 52 which is slidably mounted on a reduced-diameter portion 54 of the socket member 18. The spacer 52 may be a split ring which engages an inwardly directed shoulder 56 on the sleeve 22.

At its outer end the sleeve 22 is provided with tapered cam surfaces 58 which engage the outer surfaces 60 of the punches 26 so that as the sleeve 22 moves outwardly along the socket member 18, the punches 26 are cammed inwardly so that the end portions 62 thereof are driven through the openings 44 into the socket 20 to engage the sides of the nut positioned therein. Spring members 64 are disposed between the punches 26 and the socket member 18 and urge the punches 26 outwardly.

The piston member 24 is slidably mounted on the housing member 14 and seals 66 and 70 are disposed between the piston 24 and the housing 14. The piston 24 and the housing cooperate to define a cylinder 72 therebetween which is disposed between the seals 66 and 70. A passage 74 in the housing 14 communicates with the cylinder 72 and with a tapped opening 76 which is adapted to receive a fitting through which fluid under pressure is supplied to the cylinder 72 to slide the piston 24 and sleeve 22 forwardly to cause the punches 26 to perform the crimping operation. A thrust bearing 78 is disposed between the inner end of the sleeve 22 and outer end of the housing 14.

In operation the tool is coupled to the drive shaft 12 of a power tool, such as a torque wrench, and the passage 74 is connected to a source of fluid under pressure. The pressure fluid may be from the same source as the pressure fluid which operates the tool 10, or a separate source of pressure may be used. The socket 20 is then fitted over the nut and bolt assembly with the end wall 80 of the socket member 18 engaging the surface 82 of one of the parts to be secured together by the locknut assembly. The drive shaft 12 is then actuated to rotate the socket member and the nut to tighten the nut on the bolt until a predetermined tension in the bolt is achieved. The pressure fluid is then supplied through passage 74 to the cylinder 72 to cause the piston 24 and sleeve 22 to slide outwardly to force the punches 26 through the openings 44 in the socket member to crimp the nut to cause substantially complete engagement of the threads of the nut and the bolt around the periphery of the bolt. When the pressure fluid is released, the spring 48 will force the sleeve 22 and piston 24 to their retracted pistons while the spring members 64 will retract the punches 26 to enable the tool to be withdrawn from the locknut assembly. The pressure fluid for actuating the piston 24 may be either pneumatic or hydraulic, and it is also apparent that the return movement of sleeve 22 may be effected by supplying fluid under pressure to the space between sleeve 22 and socket member 18 rather than by use of spring 48.

When used with a standard hexagonal nut as shown in the drawings, it is preferred that each of the six sides of the nut be distorted inwardly by a punch 26. Although it is possible to crimp less than all of the sides of the nut, it has been found that a more uniform and complete engagement of the threads of the nut and bolt is achieved when a greater number of sides of the nut are crimped. It is contemplated that the tool described herein may be used to make locknut assemblies of the kind disclosed in the aforesaid copending application Ser. No. 832,611, and that it may also be used to make locknut assemblies consisting of a nut and bolt of configurations other than those described in said application. For example, similar locknut assemblies may be made using a standard round bolt and a standard nut, rather than the oval bolt or other configurations disclosed in such application. While the tool has been illustrated in the form of a separate adapter to be used with a conventional torque wrench, it is contemplated that an integral, power-operated unit may be used to form the assembly.

Figure 2 shows a completed locknut assembly in which the punches 26 have formed indentations 84 in the sides of the nut.

FIGS. 3, 4 and 5 illustrate a modified form of the invention in which a single power tool is adapted to both tighten the nut on the bolt and then crimp the nut to lock the nut on the bolt. In this form of invention the power tool 90 is provided with a barrel portion 92 and a grip portion 94 having a conduit 96 connected thereto through which power is supplied to the tool to rotate the nut and then perform the crimping operation. A drive shaft 98 has a split collet member 100 secured thereto and extends through a piston 102 disposed within a cylinder 104. The piston 102 engages the inner end of a sleeve 106 slidably mounted within the outer end of the barrel 92. The outer end of the collet member 100 is provided with a socket 108 adapted to receive the nut to tighten the nut on the bolt as the drive shaft 98 and collet 100 are rotated by the tool. After the nut has been tightened to the required degree, fluid pressure is supplied to the cylinder 104 to force the piston 102 and sleeve 106 forwardly to deflect the segments of the collet 100 which form the socket 108 inwardly as the outer end 110 of the sleeve 106 slides over the cam surface 112 of the collet. A projection 114 on each of the sides of the socket 108 is forced into the side of the nut to distort the material of the nut to cause substantially complete engagement of the threads of the nut and bolt.

The assembly tool described herein is adapted for use in production assemblies and provides a very rapid and inexpensive locknut assembly with the use of only a single tool which both tightens the nut and locks the same to the bolt.

What I claim as my invention is:

1. A tool for tightening a nut onto a bolt and locking the nut on the bolt to form a locknut assembly, comprising a housing member, a member rotatably mounted in said housing member and adapted to be drivingly connected to the drive shaft of a power tool or the like, said member including a socket at is outer end adapted to be fitted over a nut threaded onto a bolt for tightening the nut onto the bolt upon operation of the drive shaft, crimping means associated with said socket member and engageable with the sides of a nut positioned in said socket, and movable means engageable with said crimping means and operable during movement thereof to cause said crimping means to deform the sides of the nut inwardly to cause substantial engagement of the threads of the nut and bolt to lock the nut on the bolt.

2. A tool according to claim 1 wherein said crimping means comprises a plurality of punches movably mounted on said socket member, a sleeve slidably mounted on said socket member and engageable with said punches upon sliding movement thereof to effect the crimping of the nut, and a piston associated with said housing member for moving said sleeve into engagement with said punches.

3. A tool according to clam 2 wherein said piston is slidably mounted on said housing member and cooperates therewith to define a cylinder therebetween, and passage means for supplying fluid under pressure to said cylinder to actuate said piston.

4. A tool according to claim 2 including spring means urging said punches to a retracted position out of engagement with the nut.

5. A tool according to claim 1 wherein said socket member comprises a split collet having said socket therein, said crimping means comprising projections on the walls of said socket engageable with the sides of the nut, and a sleeve slidable on said housing and engageable with said collet to force said projections into the sides of the nut.

6. A tool for tightening a nut onto a bolt and locking nut on the bolt to form a locknut assembly, comprising a housing, a coupling member rotatably mounted in said housing and having coupling means at one end thereof adapted to be drivingly connected to the drive shaft of a power tool or the like, a socket member rotatable with said coupling member and having a socket at its outer end adapted to be fitted over a nut threaded onto a bolt for tightening the nut onto the bolt upon operation of the drive shaft, a sleeve slidably mounted on said socket member, a plurality of punches mounted on the outer end of said socket member and having portions thereof movable through openings in the walls of said socket into engagement with the sides of a nut positioned therein, said punches being engaged by said sleeve and moved inwardly through said openings upon movement of said sleeve toward the outer end of said socket member, spring means urging said sleeve to a retracted position on said socket member, a piston member slidably mounted on said housing and engageable with said sleeve, said housing and said piston cooperating to define a cylinder therebetween, and passage means in said housing for supplying fluid under pressure to said cylinder for sliding said sleeve along said socket member into engagement with said punches to cause the latter to deform the sides of the nut to effect close engagement of the threads of the nut and bolt to lock the nut on the bolt 7. A tool according to claim 6 including spring means urging said punches out of engagement with the sides of the nut.

8. A tool according to claim 1 wherein said crimping means comprises a plurality of punches movably mounted on said socket member, said movable means being engageable with said punches upon movement thereof to effect the crimping of the nut.

9. A tool for tightening a nut onto a bolt and locking the nut on the bolt to form a locknut assembly, comprising a housing member, a member rotatably mounted in said housing member and adapted to be drivingly connected to the drive shaft of a power tool or the like, said member including a socket at its outer end adapted to be fitted over a nut threaded onto a bolt for tightening the nut onto the bolt upon operation of the drive shaft, crimping means associated with said socket member and engageable with the sides of a nut positioned in said socket, and actuating means operable upon movement thereof in one direction to engage said crimping means to cause radially inward movement of the latter into the sides of the nut to deform the same to cause substantial engagement of the threads of the nut and bolt to lock the nut on the bolt.

10. A tool according to claim 9 including power-operated means for effecting said movement of said actuating means in said one direction.

11. A tool according to claim 9 wherein said actuating means is movable relative to said socket member in an axial direction.